Dec. 22, 1942.                E. O. BERNHARDT                 2,305,760
                              MICROSCOPIC OBJECTIVE
                              Filed Nov. 25, 1940

Inventor:
Eugen Otto Bernhardt

Patented Dec. 22, 1942

2,305,760

UNITED STATES PATENT OFFICE 2,305,760

MICROSCOPE OBJECTIVE

Eugen Oskar Bernhardt, Jena, Germany; vested in the Alien Property Custodian

Application November 25, 1940, Serial No. 367,009
In Germany December 8, 1939

3 Claims. (Cl. 88—57)

The invention relates to a microscope objective intended for use in conjunction with a microscope designed as a hardness testing instrument, the front member of said objective being immediately connected with an indentation body for producing therein an impression of the object to be tested. An indentation body for this purpose has the shape of a spherical segment, of a pyramid or of a cone. The image of the impression produced by means of the indentation body is being measured by the microscope whereby the magnitude of the impression serves as a criterion for the hardness of the tested material. If it be intended to use a microscope objective having a superhemispherical front member where at least one hemisphere is to be available as an effectively refractive means in order to have an objective of high numerical aperture, the known objectives of this kind are not suitable on account of their front member being disposed a certain distance away from the member following it. Therefore, it cannot be so securely mounted in a mechanical way as to withstand any pressure exerted upon it from without, but will become loose in its mount and fall out of it.

To do away with this drawback the microscope objective according to the invention is so constructed that in the neighbourhood of its optic axis the foremost member is in contact with the second member, either directly or through a spacing element disposed between said two members, so that any pressure exerted upon the foremost member is conveyed to the next following member and absorbed by the mount of the latter.

A specially advantageous model is obtained if the contact area of the two members in contact with one another represents a ball cup.

Figure 1:
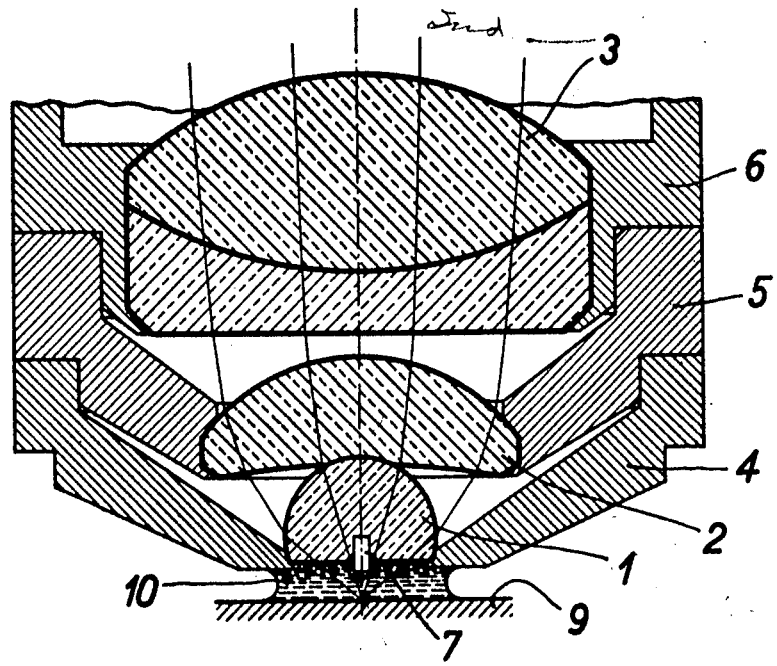
Figures 2, 3:
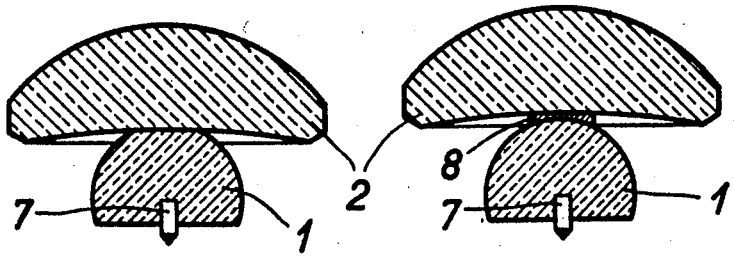

Constructional examples of the invention are illustrated in Figs. 1 to 3 of the annexed drawing, Fig. 1 showing the mounting of the front lens of a microscope objective drawn in longitudinal section containing the optic axis of the objective.

Figs. 2 and 3 showing the longitudinal section of two further constructional examples of the invention.

In Fig. 1 only the first three members 1, 2 and 3 of a microscope objective are shown, disposed each in mounts 4, 5 and 6. The form of the front lens is superhemispherical and the front lens is provided with an indentation body 7 lying in the direction of optic axis of the objective. The vertex distance between the front lens and the collective meniscus 2 is so chosen that the two members are in touch with one another along one surface, the surface of contact being adapted to the curved surface of the front lens, while in Fig. 2 the contact surface is adapted to the curved surface of the meniscus facing the front lens. Fig. 3 shows the front lens 1 being disposed a distance away from the meniscus 2, a spacing body 8, of tin-foil, for instance, being located between the two members. An object to be tested is referred to in the drawing as 9. Between said object and the front lens 1 an immersion fluid 10 is provided for.

I claim:

1. A microscope objective for a microscope designed as a hardness testing instrument, comprising a plurality of members in axial alignment, each of said members being placed in a mounting collar, the collars being disposed undisplaceably to each other, the foremost member of the objective being of superhemispherical shape, a body of hard material for producing an imprint in an object to be tested, said body being mounted upon the front surface of the said foremost member, said foremost member being in the area surrounding its optic axis in contact with the next following member and being supported by the next following member when an object is being imprinted.

2. In a microscope objective according to claim 1, the contact surface of the foremost and the next member being a ball cup.

3. A microscope objective for a microscope designed as a hardness testing instrument, comprising a plurality of members in axial alignment, each of said members being placed in a mounting collar, the collars being disposed undisplaceably to each other, the foremost member of the objective being of superhemispherical shape, a body of hard material for producing an imprint in an object to be tested, said body being mounted upon the front surface of the said foremost member, and further comprising a spacing body, said spacing body being so disposed undisplaceably between said foremost member and the next following member that it touches the two said members in the area surrounding their optic axis and said foremost member being supported by the next following member when an object is being imprinted.

EUGEN OSKAR BERNHARDT.